United States Patent
Nasr et al.

(10) Patent No.: US 10,428,664 B2
(45) Date of Patent: Oct. 1, 2019

(54) NOZZLE FOR A GAS TURBINE ENGINE

(71) Applicant: General Electric Company, Schenectady, NY (US)

(72) Inventors: Hojjat Nasr, West Chester, OH (US); Ronald Scott Bunker, West Chester, OH (US); Gregory Michael Laskowski, Rowley, MA (US); Erich Alois Krammer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 939 days.

(21) Appl. No.: 14/884,134

(22) Filed: Oct. 15, 2015

(65) Prior Publication Data

US 2017/0107834 A1    Apr. 20, 2017

(51) Int. Cl.
*F01D 9/04* (2006.01)
*F01D 25/08* (2006.01)
(Continued)

(52) U.S. Cl.
CPC ............. *F01D 9/041* (2013.01); *F01D 9/065* (2013.01); *F01D 25/08* (2013.01); *F02C 3/04* (2013.01);
(Continued)

(58) Field of Classification Search
CPC .......... F01D 9/041; F01D 25/08; F01D 25/12; F01D 25/14; F01D 5/147; F01D 5/18;
(Continued)

(56) References Cited

U.S. PATENT DOCUMENTS 2,806,551 A    9/1957 Heinrich
3,064,411 A    11/1962 Breslove, Jr.
(Continued)

FOREIGN PATENT DOCUMENTS

EP    0162441 A2    11/1985
EP    0227577 A2    7/1987
(Continued)

OTHER PUBLICATIONS

How A Virtual Impactor Works, TSI Incorporated, ITI-051 Rev. B, 2013.*
(Continued)

*Primary Examiner* — Phutthiwat Wongwian
*Assistant Examiner* — Loren C Edwards
(74) *Attorney, Agent, or Firm* — McGarry Bair PC

(57) ABSTRACT

A nozzle assembly for a gas turbine engine includes at least one pair of fixed vanes to define a nozzle between the pair of fixed vanes. The vanes can have an interior chamber defining a cooling circuit with a particle separator located within the interior chamber. The particle separator, which can comprise a virtual impactor, can have an accelerator for accelerating fluid moving through the virtual impactor such that the flow path is divided into a major flow moving into the interior chamber and a minor flow moving into a particle collector defined within the virtual impactor. The accelerator accelerates the fluid such that particles within the fluid are carried by their momentum into the particle collector with the minor flow, removing the particles from the major flow of fluid moving into the interior chamber.

24 Claims, 6 Drawing Sheets

(51) Int. Cl.
*F02C 3/04* (2006.01)
*F01D 9/06* (2006.01)

(52) U.S. Cl.
CPC .... *F05D 2220/32* (2013.01); *F05D 2240/128* (2013.01); *F05D 2260/607* (2013.01); *Y02T 50/672* (2013.01); *Y02T 50/675* (2013.01)

(58) Field of Classification Search
CPC .......... F01D 5/186; F01D 5/187; F01D 5/188; F02C 3/04; F02C 7/18; F02C 7/052; F05D 2220/32; F05D 2240/128
USPC ......................................................... 60/806
See application file for complete search history.

(56) References Cited

U.S. PATENT DOCUMENTS

| | | |
|---|---|---|
| 3,274,757 A | 9/1966 | Wapler |
| 3,302,396 A | 2/1967 | Louis |
| 3,309,867 A | 3/1967 | Ehrich |
| 3,421,299 A | 1/1969 | Poplawski |
| 3,993,463 A | 11/1976 | Barr |
| 4,378,234 A | 3/1983 | Suzuki et al. |
| 4,527,387 A | 7/1985 | Lastrina et al. |
| 4,650,578 A | 3/1987 | Cerdan et al. |
| 4,685,942 A | 8/1987 | Klassen et al. |
| 4,767,260 A * | 8/1988 | Clevenger ............... F01D 9/041 415/115 |
| 4,767,524 A | 8/1988 | Yeh et al. |
| 4,820,122 A | 4/1989 | Hall et al. |
| 4,820,123 A | 4/1989 | Hall |
| 4,992,025 A | 2/1991 | Stroud et al. |
| 5,062,768 A | 11/1991 | Marriage |
| 5,135,354 A | 8/1992 | Novotny |
| 5,193,975 A | 3/1993 | Bird et al. |
| 5,279,109 A | 1/1994 | Liu et al. |
| 5,348,571 A | 9/1994 | Weber |
| 5,498,273 A | 3/1996 | Mann |
| 5,538,394 A | 7/1996 | Inomata |
| 5,558,496 A | 9/1996 | Woodmansee |
| 5,700,131 A | 12/1997 | Hall et al. |
| 5,788,741 A | 8/1998 | Burton et al. |
| 5,827,043 A | 10/1998 | Fukuda et al. |
| 5,857,833 A | 1/1999 | Dev |
| 5,918,458 A | 7/1999 | Coffinberry et al. |
| 5,951,250 A | 9/1999 | Suenaga et al. |
| 6,033,181 A | 3/2000 | Endres et al. |
| 6,039,537 A | 3/2000 | Scheurlen |
| 6,151,881 A | 11/2000 | Al et al. |
| 6,164,913 A | 12/2000 | Reddy |
| 6,238,183 B1 | 5/2001 | Williamson et al. |
| 6,238,459 B1 | 5/2001 | Downs |
| 6,261,053 B1 | 7/2001 | Anderson et al. |
| 6,264,428 B1 | 7/2001 | Dailey et al. |
| 6,277,278 B1 | 8/2001 | Conrad et al. |
| 6,318,960 B1 | 11/2001 | Kuwabara et al. |
| 6,318,963 B1 | 11/2001 | Emery et al. |
| 6,368,060 B1 | 4/2002 | Fehrenbach et al. |
| 6,382,906 B1 | 5/2002 | Brassfield et al. |
| 6,413,044 B1 | 7/2002 | Roeloffs et al. |
| 6,527,829 B1 | 3/2003 | Malkamaeki et al. |
| 6,673,133 B2 | 1/2004 | Sechrist et al. |
| 6,698,180 B2 | 3/2004 | Snyder |
| 6,840,737 B2 | 1/2005 | Flatman |
| 6,875,256 B2 | 4/2005 | Gillingham et al. |
| 6,910,370 B2 | 6/2005 | Clark et al. |
| 6,969,237 B2 | 11/2005 | Hudson |
| 7,048,501 B2 | 5/2006 | Katayama et al. |
| 7,052,532 B1 | 5/2006 | Liu et al. |
| 7,080,972 B2 | 7/2006 | Rawlinson |
| 7,097,419 B2 | 8/2006 | Lee et al. |
| 7,128,533 B2 | 10/2006 | Liang |
| 7,137,777 B2 | 11/2006 | Fried et al. |
| 7,244,101 B2 | 7/2007 | Lee et al. |
| 7,284,953 B2 | 10/2007 | Silverman et al. |
| 7,540,712 B1 | 6/2009 | Liang |
| 7,563,073 B1 | 7/2009 | Liang |
| 7,572,102 B1 | 8/2009 | Liang |
| 7,581,397 B2 | 9/2009 | Strangman et al. |
| 7,582,145 B2 | 9/2009 | Krigmont et al. |
| 7,645,122 B1 | 1/2010 | Liang |
| 7,665,965 B1 | 2/2010 | Liang |
| 7,770,375 B2 | 8/2010 | Alvanos et al. |
| 7,874,158 B2 | 1/2011 | O'Neill et al. |
| 7,879,123 B2 | 2/2011 | Lundquist et al. |
| 7,921,654 B1 | 4/2011 | Liang |
| 7,922,784 B2 | 4/2011 | Saeed et al. |
| 7,934,906 B2 | 5/2011 | Gu et al. |
| 7,955,053 B1 | 6/2011 | Liang |
| 7,976,277 B2 | 7/2011 | Kopmels et al. |
| 8,092,145 B2 | 1/2012 | Martel et al. |
| 8,104,362 B2 | 1/2012 | McFarland et al. |
| 8,142,153 B1 | 3/2012 | Liang |
| 8,348,614 B2 | 1/2013 | Piggush et al. |
| 8,573,034 B2 | 11/2013 | Grant et al. |
| 8,626,467 B2 | 1/2014 | Fang |
| 8,672,629 B2 | 3/2014 | Botrel et al. |
| 8,733,185 B2 | 5/2014 | Solomon |
| 8,746,464 B2 | 6/2014 | Maier |
| 8,943,791 B2 | 2/2015 | Tibbott et al. |
| 2002/0166200 A1 | 11/2002 | Conrad et al. |
| 2002/0182062 A1 | 12/2002 | Scimone |
| 2004/0197191 A1 | 10/2004 | Cunha et al. |
| 2004/0221720 A1 | 11/2004 | Anderson et al. |
| 2005/0118024 A1 | 6/2005 | Anguisola et al. |
| 2005/0129508 A1 | 6/2005 | Fried et al. |
| 2005/0214118 A1 | 9/2005 | Dodd et al. |
| 2006/0073015 A1 | 4/2006 | Liang |
| 2006/0133923 A1 | 6/2006 | Paauwe et al. |
| 2006/0275118 A1 | 12/2006 | Lee |
| 2007/0048122 A1 | 3/2007 | Van et al. |
| 2007/0140848 A1 | 6/2007 | Charbonneau et al. |
| 2008/0041064 A1 | 2/2008 | Moore et al. |
| 2008/0310951 A1 | 12/2008 | Bremer |
| 2009/0060715 A1 | 3/2009 | Kopmels |
| 2009/0081024 A1 * | 3/2009 | Tibbott ................... F01D 5/187 415/115 |
| 2009/0126337 A1 | 5/2009 | Hazzard |
| 2009/0155088 A1 | 6/2009 | Lee et al. |
| 2009/0202337 A1 | 8/2009 | Bosley et al. |
| 2009/0214329 A1 | 8/2009 | Joe et al. |
| 2009/0255230 A1 | 10/2009 | Mildner |
| 2009/0261208 A1 | 10/2009 | Belyew |
| 2010/0021308 A1 | 1/2010 | Rawlinson |
| 2010/0024370 A1 | 2/2010 | Jones et al. |
| 2010/0040480 A1 | 2/2010 | Webster et al. |
| 2010/0119377 A1 | 5/2010 | Tibbott et al. |
| 2010/0162682 A1 | 7/2010 | Lerg |
| 2010/0172762 A1 | 7/2010 | Rawlinson |
| 2010/0239409 A1 | 9/2010 | Draper |
| 2010/0247321 A1 | 9/2010 | Kulkarni et al. |
| 2010/0254801 A1 | 10/2010 | Tibbott |
| 2011/0016838 A1 | 1/2011 | Smithies et al. |
| 2011/0047959 A1 | 3/2011 | Dibenedetto |
| 2011/0067409 A1 * | 3/2011 | Beeck ..................... F01D 5/08 60/772 |
| 2011/0236188 A1 | 9/2011 | Knapp et al. |
| 2011/0247345 A1 | 10/2011 | Laurello et al. |
| 2011/0247347 A1 | 10/2011 | Ebert et al. |
| 2012/0070308 A1 | 3/2012 | Naik et al. |
| 2012/0207594 A1 | 8/2012 | Chanez et al. |
| 2012/0233973 A1 | 9/2012 | Sedillo |
| 2013/0192257 A1 | 8/2013 | Horine et al. |
| 2013/0223987 A1 | 8/2013 | Stafford et al. |
| 2014/0083116 A1 | 3/2014 | Crites et al. |
| 2014/0196437 A1 | 7/2014 | Schneider |
| 2014/0259924 A1 * | 9/2014 | Leininger ............... C10K 1/022 48/99 |

(56) References Cited

U.S. PATENT DOCUMENTS

2014/0290254 A1 10/2014 Manning et al.
2017/0107852 A1 4/2017 Nasr et al.

FOREIGN PATENT DOCUMENTS

| | | |
|---|---|---|
| EP | 0340149 A1 | 11/1989 |
| EP | 0690202 A2 | 1/1996 |
| EP | 0924408 A2 | 6/1999 |
| EP | 1267037 A2 | 12/2002 |
| EP | 2405985 A2 | 1/2012 |
| EP | 2549078 A1 | 1/2013 |
| EP | 2713011 A1 | 2/2014 |
| EP | 2927428 A1 | 10/2015 |
| GB | 711304 A | 6/1954 |
| GB | 1070458 A | 6/1967 |
| GB | 1146262 A | 3/1969 |
| GB | 1412780 A | 11/1975 |
| GB | 2270481 A | 3/1994 |
| WO | 2011006262 A1 | 1/2011 |

OTHER PUBLICATIONS

Poplawski et al., "Microscopic Particle Separation and Applications", Aerospace Research Laboratories, 20 Years of Research Progress, Accession No. AD0667557, Project No. 7116, pp. 1-67, Feb. 1968.
Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.
Sennett, "Air Filtration: Perfect Air Filtering for Gas Turbines." Filtration & Separation, vol. 44, Issue. 10, pp. 20-22, Dec. 2007.
Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 3-12, 2009.
Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.
Filippone et al., "Turboshaft Engine Air Particle Separation", Progress in Aerospace Sciences, vol. No. 46, Issue No. 5-6, pp. 224-245, Jul.-Aug. 2010.
Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.
Lawson et al., "Simulations of Multiphase Particle Deposition on a Showerhead With Staggered Film-Cooling Holes", Journal of Turbomachinery, Transactions of the ASME, Volume No. 134, pp. 051041-1-051041-12, Sep. 2012.
European Search Report and Opinion issued in connection with related EP Application No. 15169688.7 dated Oct. 27, 2015.
PCT Invitation to Pay Additional Fees issued in connection with related PCT Application No. PCT/US2015/033108 dated Mar. 1, 2016.
European Search Report and Opinion issued in connection with related EP Application No. 15190287.1 dated Mar. 4, 2016.
PCT Search Report and Written Opinion issued in connection with related PCT Application No. PCT/US2015/032855 dated Mar. 14, 2016.
European Search Report and Opinion issued in connection with related EP Application No. 15191609.5 dated Mar. 18, 2016.
PCT Search Report and Written Opinion issued in connection with related PCT Application No. PCT/US2015/033108 dated Jul. 12, 2016.
PCT International Preliminary Report on Patentability issued in connection with Related PCT Application No. PCT/US2015/033108 dated Nov. 29, 2016.
PCT International Preliminary Report on Patentability issued in connection with corresponding PCT Application No. PCT/US2015/032855 dated Nov. 29, 2016.
European Search Report and Opinion issued in connection with corresponding EP Application No. 16193576.2 dated Mar. 21, 2017.
U.S. Non-Final Office Action issued in connection with Related U.S. Appl. No. 14/715,700 dated Apr. 5, 2017.
Starkweather, J. H., et al., Inducer Assembly for Turbine Engine, GE U.S. Appl. No. 62/004,736, filed May 29, 2014.
Laskowski, G. M., et al., Turbine Engine, GE U.S. Appl. No. 62/004,764, filed May 29, 2014.
Laskowski, G. M., et al., Turbine Engine, GE U.S. Appl. No. 62/004,768, filed May 29, 2014.
Murray, R. C., et al., Shroud Assembly for Turbine Engine, GE U.S. Appl. No. 62/004,766, filed May 29, 2014.
Murray, R. C., et al., Centrifugal Separator, GE U.S. Appl. No. 62/004,710, filed May 29, 2014.
Manning, R. F., et al., Initial Separator, GE U.S. Appl. No. 62/004,721, filed May 29, 2014.
Correia, V. H. S., et al., Engine Component for a Turbine Engine, GE U.S. Appl. No. 62/073,525, filed Oct. 31, 2014.
Murray, R. C., et al., Separator Assembly for a Gas Turbine Engine, GE U.S. Appl. No. 62/073,514, filed Oct. 31, 2014.
Buhler, J. P., et al., Assembly for a Gas Turbine Engine, GE U.S. Appl. No. 62/073,53, filed Oct. 31, 2014.
Starkweather, J. H., et al., Inducer Assembly for Turbine Engine, GE U.S. Appl. No. 62/004,728, filed May 29, 2014.
European Search Report and Opinion issued in connection with corresponding EP Application No. 16193374.2 dated Feb. 16, 2017.
GE Related Case Form.
Hojjat Nasr et al., Oct. 15, 2015, U.S. Appl. No. 14/884,152.

* cited by examiner

NOZZLE FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is about 500° C. to 700° C. While the compressor air is a high temperature, it is cooler relative to the turbine air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants, in the cooling air can cause a loss of cooling and reduced operational time or "time-on-wing" for the aircraft environment. This problem is exacerbated in certain operating environments around the globe where turbine engines are exposed to significant amounts of airborne particles. Particles supplied to the turbine components can clog, obstruct, or coat the flow passages and surfaces of the components, which can reduce the lifespan of the components.

BRIEF DESCRIPTION OF THE INVENTION

A nozzle assembly for a gas turbine engine having a compressor, a combustor, and a turbine contained within in an outer casing, with the turbine having a plurality of annularly-arranged rotating blades comprising the nozzle assembly to define one stage of the turbine. The nozzle assembly comprises at least one vane defining a nozzle with the at least one of the vane having an interior chamber with a cooling circuit inlet passages and a scavenge flow outlet passage. The nozzle assembly further comprises a cooling circuit having a first portion fluidly coupled to the cooling circuit inlet passage and supplying a cooling fluid stream to the chamber through the cooling circuit inlet passage and a second portion fluidly coupled to the cooling circuit outlet passage, defining a scavenge flow passage. The nozzle assembly further comprises at least one particle separator located within the chamber and having a flow accelerator with an accelerator inlet and an accelerator outlet, which is smaller in cross-sectional area than the accelerator inlet, and a particle collector having a collector inlet and a collector outlet and defining a scavenge conduit between the collector inlet and the collector outlet, with the collector inlet aligned with and spaced form the accelerator outlet to define a gap, with the collector outlet fluidly coupled to the scavenge flow passage. The size of the gap and the relative size of the accelerator outlet and collector inlet are selected such that a first portion of the cooling fluid stream exiting the accelerator outlet flows out through the gap, and a second portion of the cooling fluid stream flows directly from the accelerator outlet, across the gap, and into the collector inlet, with particles entrained in the cooling fluid stream that are primarily constrained by the momentum in the second portion of the cooling fluid stream to define a scavenge fluid stream.

A component for a turbine engine having a compressor, a combustor, and a turbine within a casing, with the turbine having a plurality of annularly-arranged fixed vanes defining a nozzle and a plurality of annularly-arranged rotating blades paired with the fixed vanes to define one stage of the turbine. The component comprises a body defining an interior chamber with a cooling circuit inlet passage and a scavenge flow outlet passage, a cooling circuit having a first portion fluidly coupled to the cooling circuit inlet passage and supplying a cooling fluid stream to the chamber through the cooling circuit inlet passage and a second portion fluidly coupled to the cooing circuit outlet passage and defining a scavenge flow passage, and a virtual impactor located within the chamber to define a scavenge particle fluid stream flowing through the virtual impactor and a reduced particle cooling fluid stream flowing exteriorly of the virtual impactor and within the chamber. At least a portion of a space between the virtual impactor and the component has a reduced cross-sectional area to effect an acceleration of the reduced particle cooling fluid stream.

A component for a gas turbine engine having a compressor, a combustor, and a turbine within a casing, the component comprising a body defining an interior chamber with a cooling circuit inlet passage and a scavenge flow outlet passage, a cooling circuit having a first portion fluidly coupled to the cooling circuit inlet passage and supplying a cooling fluid stream to the interior chamber through the cooling circuit inlet passage and a second portion fluidly coupled to he scavenge flow outlet passage and defining a scavenge flow passage. A virtual impactor is located within the interior chamber to define a scavenge particle fluid stream flowing through the virtual impactor and a reduced particle cooling fluid stream flowing exteriorly of the virtual impactor and within the interior chamber.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

Figure 1:
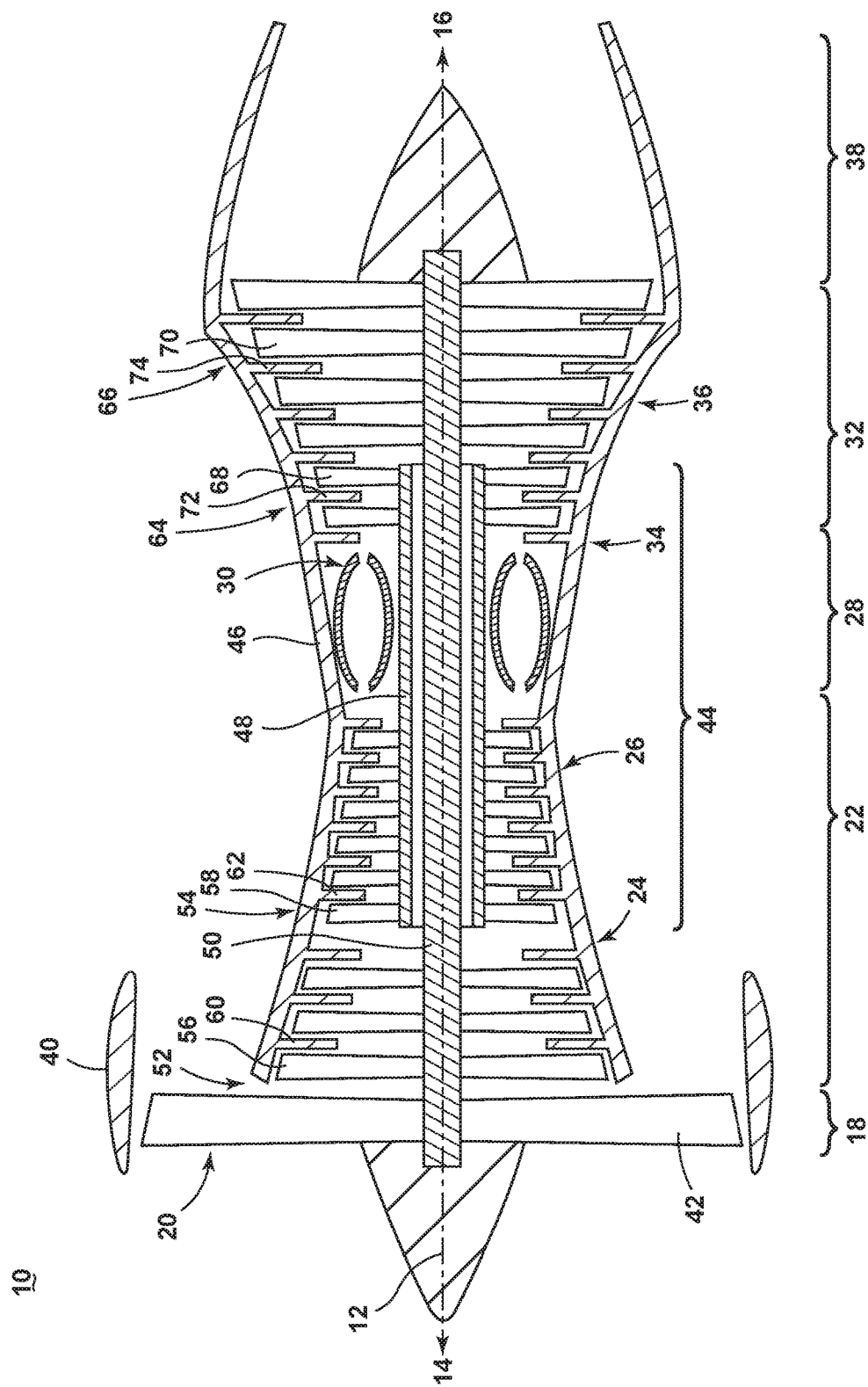
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
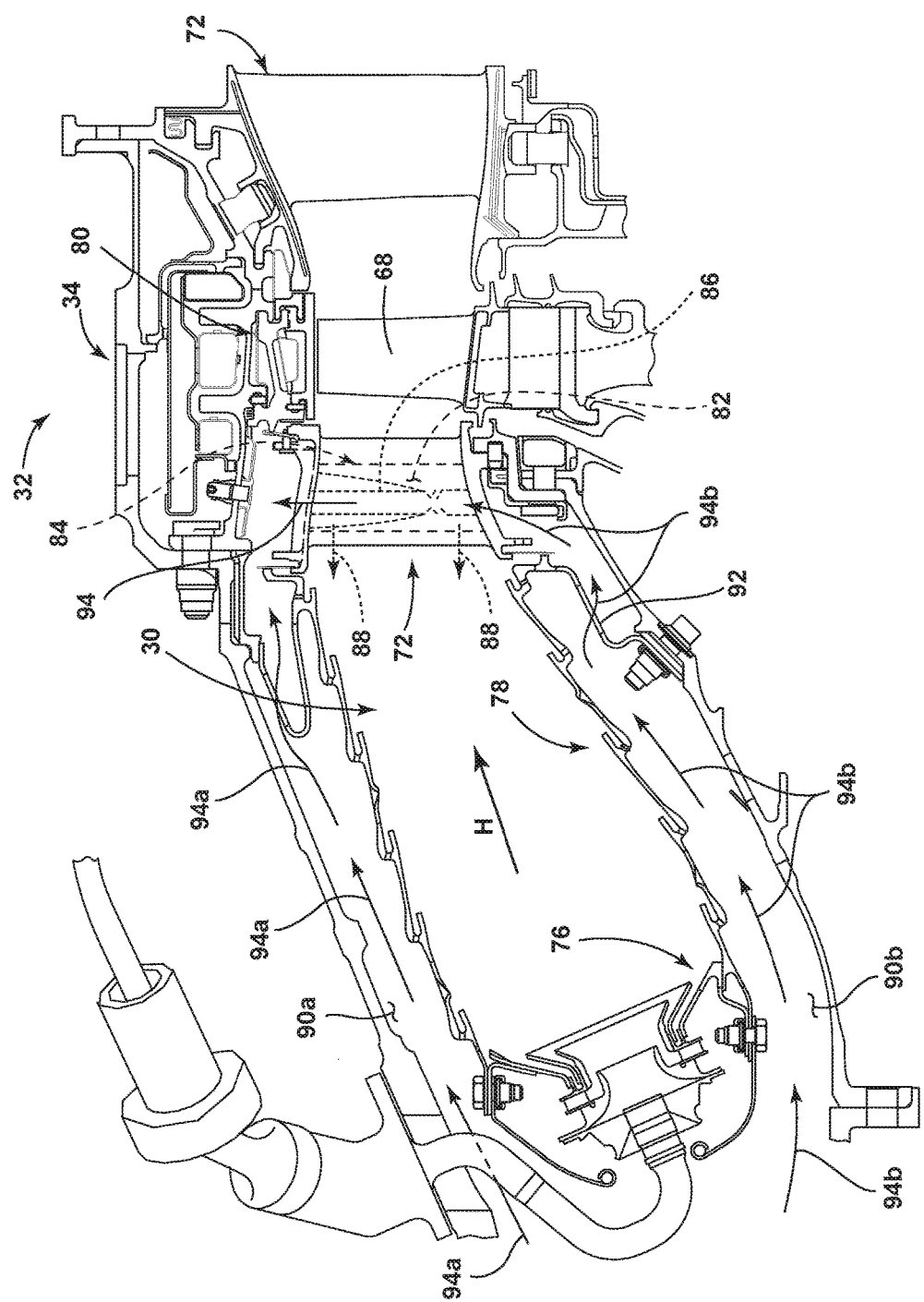
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 78. Adjacent to the turbine blade 68 of the turbine 34 in the axial direction are sets of radially spaced, static turbine vanes 72, with adjacent vanes 72 forming nozzles therebetween. The nozzles turn combustion gas to better flow into the rotating blades so that the maximum energy can be extracted by the turbine 34 A shroud assembly 80 is adjacent to the rotating blade 68 to minimize flow loss in the turbine 34. Similar shroud assemblies can also be associated with the LP turbine 36, the LP compressor 24, or the HP compressor 26. An interior chamber 82 is defined within the hollow interior of the vanes 72. An internal body 84 can be disposed within the interior chamber 82, such as an impingement insert. A particle separator 86 can be disposed within the internal body 84. One or more film holes 88 can fluidly couple the interior chamber 82 to the external surface of the vane 72.

A set of bypass channels comprising a first bypass channel 90a and a second bypass channel 90b can be disposed adjacent to the combustor 30 on the radial outboard and inboard of the combustor 30, respectively, providing fluid communication between the compressor section 22 and the turbine section 32 through at least one opening 92, bypassing the combustor 30. A cooling circuit is defined by the series of engine component passages, with arrows 94 illustrating the flow path of cooling fluid within cooling circuit. A first cooling fluid 94a flows through the first bypass channel 90a, bypassing the combustor 30 and can be fed to the vane 72 from the radial outside of the vane 72 relative to the engine centerline. Alternatively, a second cooling fluid 94b can flow through the second bypass channel 90b and can be fed to the vane 72 from the radial inside of the vane 72 relative to the engine centerline. The cooling fluid can be exhausted through one or more film holes 88 in the vane 72, or can be expelled through the shroud assembly 80 or other engine components. The discussion herein will be described in relation to the second cooling flow 94b, such that the vane 72 will be fed with a flow of cooling fluid in a radially outward direction. This flow path, however, should not be understood as limiting and is exemplary of one flow path of cooling fluid provided to the particle separator 86 within the vane 72.

It should be appreciated that the discussion relating to the cooling circuit with a particle separator 86 passing through a vane 72 of the turbine section 32 is exemplary. The cooling circuit including the particle separator 86 can be implemented in a vane in the LP compressor 24, the HP compressor 26, the HP turbine 34, and the LP turbine 36. Alternatively, the cooling circuit can be defined in additional engine components, such as the compressor blade 56, 58, the turbine blade 68, 70, or a shroud assembly in non-limiting examples.

Figure 3:
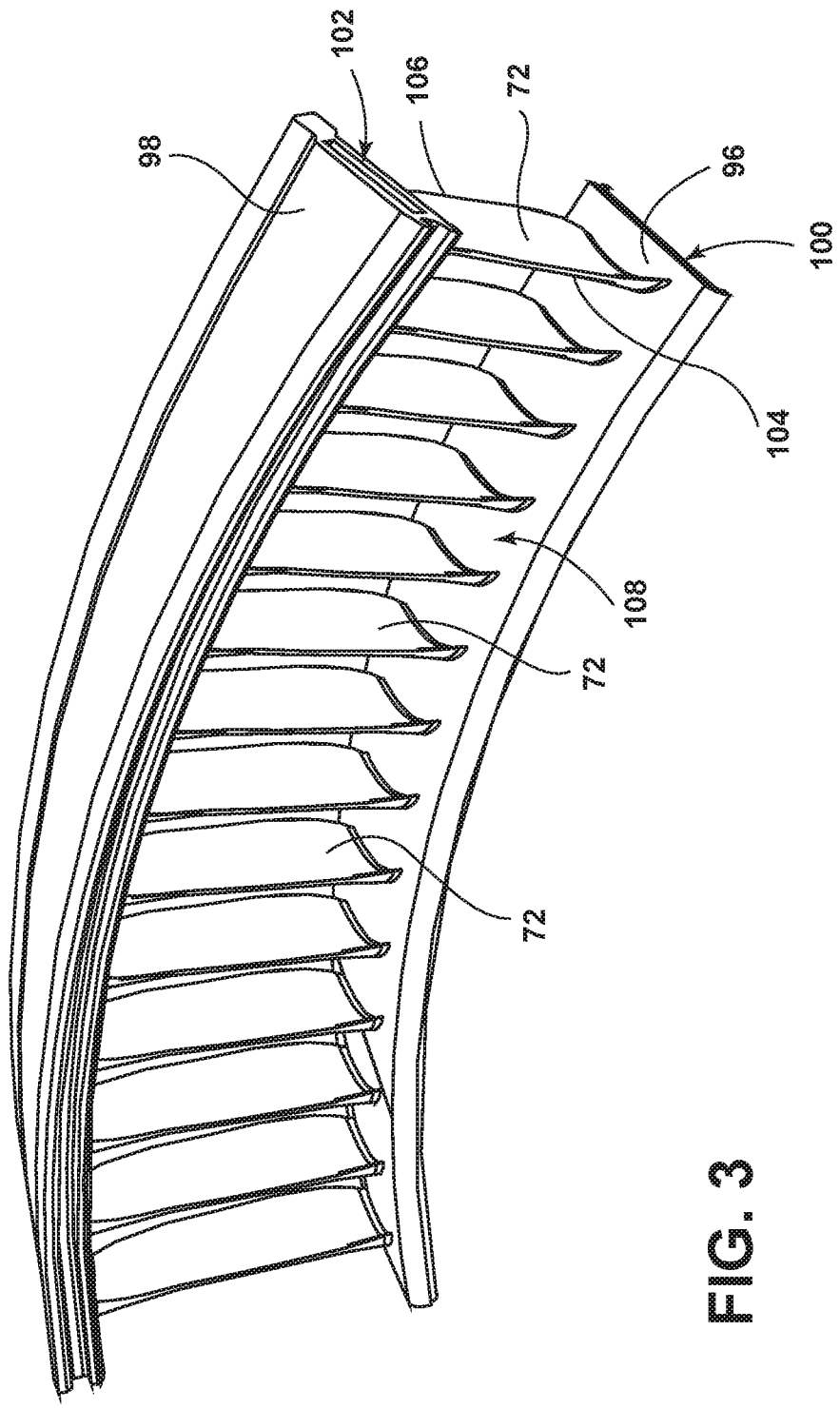
FIG. 3 is a perspective view of a portion of one of the airfoil assemblies of FIG. 2.

FIG. 3 illustrates a plurality of static vanes 72 arranged in a circumferential row and supported by an arcuate inner band 96 and an arcuate outer band 98. An inner cooling channel 100 and an outer cooling channel 102 can be defined within the inner and outer bands 96, 98, respectively. The cooling channels 100, 102 can fluidly communicate with one another through the interior chamber 82 of the vanes 72. The vanes 72 comprise a leading edge 104 and a trailing edge 106. The arcuate section shown in FIG. 3 has a sector angle of approximately 36 degrees and is exemplary of a nozzle 108 of vanes 72. In alternate embodiments, there can be any number of vanes 72 defining the respective nozzle ring 108. The vanes 72, inner band 96 and outer band 98 can be made from a known material including, but not limited to, titanium alloys, nickel, ceramic matrix composites, and cobalt based alloys.

Figure 4:
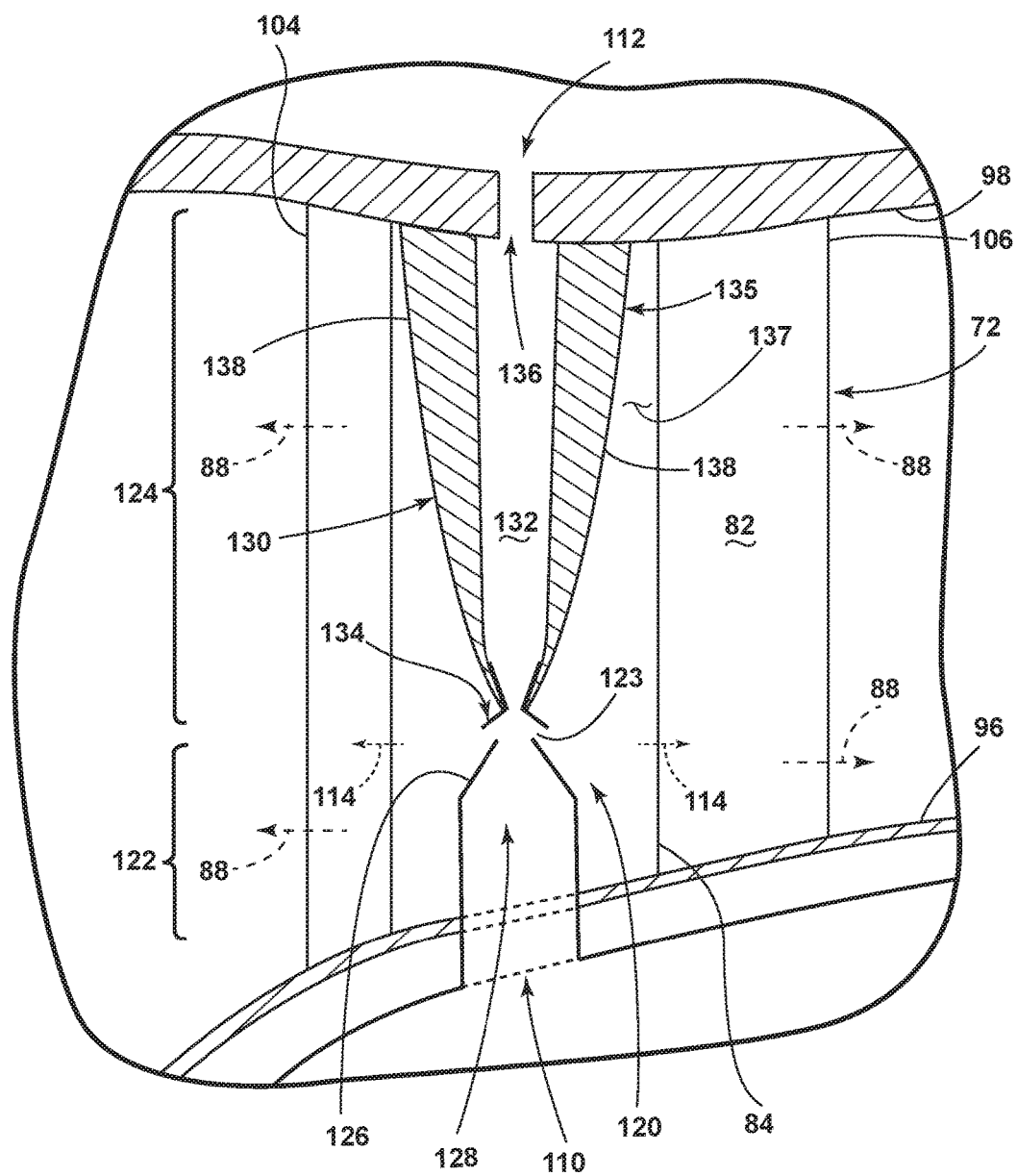
FIG. 4 is a cross-sectional diagram of a vane of FIG. 3.

Turning to FIG. 4, the internal body 84 can be mounted within or formed as part of the vane 72, or can further comprise an insert placed within the vane 72 such as an impingement insert. The interior chamber 82 can at least partially define part of the cooling circuit, which has an inlet 110 and outlet 112 to the interior chamber 82. A plurality of internal apertures 114 are disposed within the internal body 84 and the film holes 88 are extend through the walls of the vanes 72. While only two internal apertures 114 and four film holes 88 are illustrated, it should be appreciated than any number of internal apertures 114 and film holes 88 can be utilized at any desired position within the vane 72 and the internal body 84.

The particle separator 86 can further comprise a virtual impactor 120 partially defining the cooling circuit passing through the vane 72. The virtual impactor 120 can comprise a first portion 122 for particle acceleration and a second portion 124 for particle collection. The first portion 122 is mounted adjacent to and is in fluid communication with the inlet 110. A flow accelerator 126, comprising a cone-shaped converging nozzle, defines a converging cross-sectional area of the first portion 122 to form an acceleration inlet 128. A cleaned flow outlet 123 is also provided in the virtual impactor 120 and fluidly coupled to the interior chamber 82.

The second portion 124 comprises a particle collector 130 having an internal scavenge conduit 132 extending between a collector inlet 134 and a collector outlet 136, which couples to the outlet 112. The scavenge conduit 132, internal of the particle collector 130, has an increasing cross-section transitioning into a constant cross-section. The collector inlet 134 aligns with the flow accelerator 126 of the first portion 122. The collector outlet 136 is disposed between the scavenge conduit 132 and the outlet 112. The particle collector 130 can further comprise an outer wall 135 forming an increasing exterior cross-sectional area 138, such that the cross-section of the particle collector 130 increases as it extends from the collector inlet 134 toward the collector outlet 136.

It should be appreciated that the lengths of the portions 122, 124 are exemplary and can comprise any length relative to the vane 72. Additionally, the flow accelerator 126 and the collector inlet 134 can be shortened or elongated as compared to the illustration. Furthermore, the location of the collector inlet 134 can be nearer to or further from the flow accelerator 126, which can change based upon the respective lengths of the first and second portion 122, 124. Further still, the size of the component utilizing the virtual impactor can determine the relative lengths and sizes of the portions 122, 124.

It should be further appreciated that while the first and second portions 122, 124 of the virtual impactor are laterally aligned, one centerline relative to the other centerline, the portions 122, 124 can be offset. For example, a longitudinal axis through the first portion 122 and a separate longitudinal axis through the second portion 124 can be offset such that a lateral misalignment exists between the first and second portions 122, 124. Furthermore, longitudinal axes of the first and second portions 122, 124 can be offset by an angular deviation, such that the axes can intersect at a point. Such an angular deviation can be no more than twenty degrees in any direction. Further still, the angular deviation can be combined with the lateral misalignment, such that the axes never intersect, and are angularly and laterally misaligned relative to the engine centerline.

Figure 5:
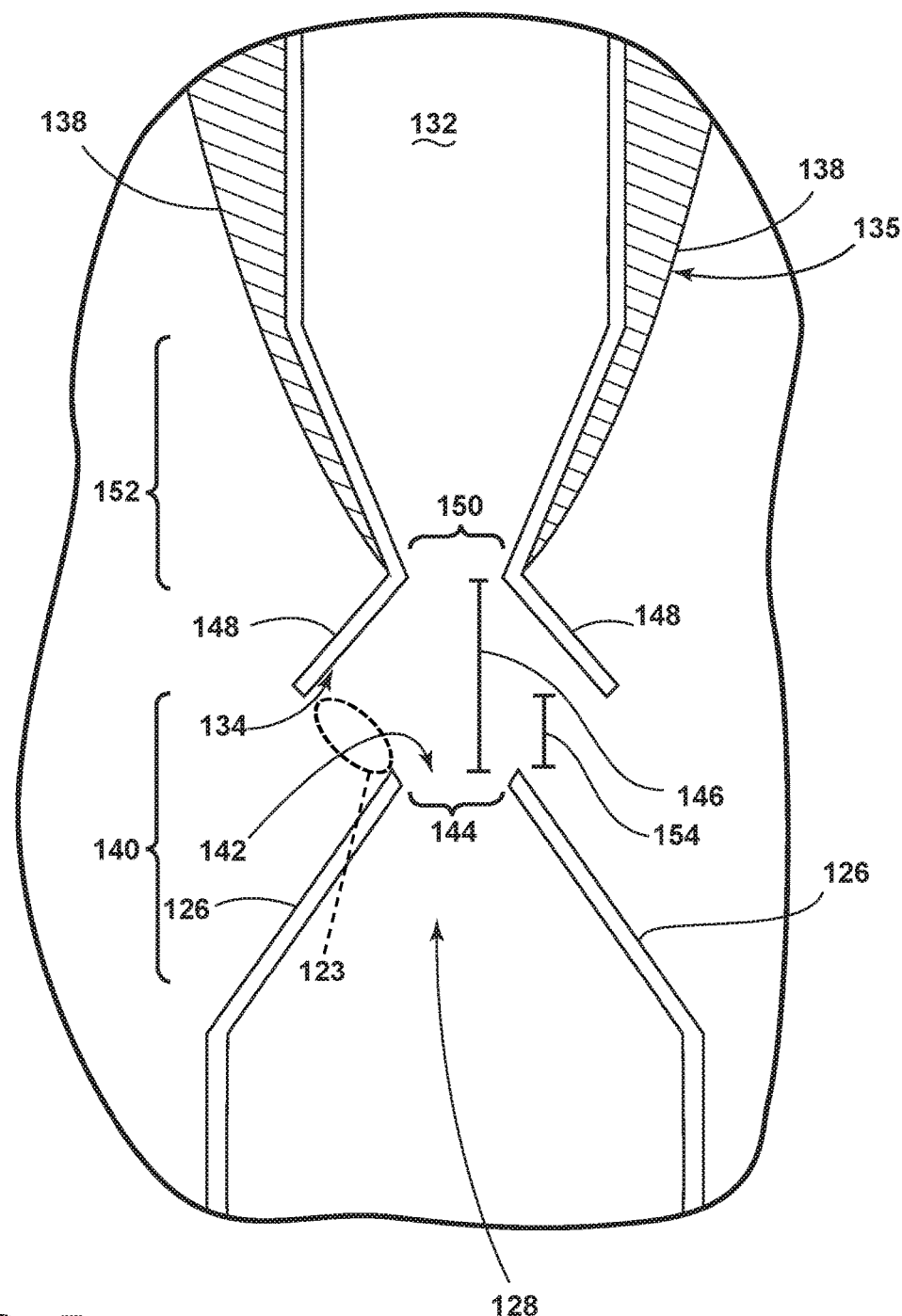
FIG. 5 is a close-up view of a virtual impactor of FIG. 4.

Turning to FIG. 5, the acceleration inlet 128 at the flow accelerator 126 comprises an acceleration zone 140 through which the cooling air is accelerated. The flow accelerator 126 comprises a converging cross-sectional area toward an accelerator outlet 142 to define a nozzle 144 at the accelerator outlet 142. The collector inlet 134 is spaced from the accelerator outlet 142 by a gap 146. An annular extension 148 defines a converging portion toward the collector inlet 134 within the gap 146. A second gap 154 is defined between the ends of the annular extensions 148 and the ends of the flow accelerator. A choke 150 is defined by the minimum cross-sectional area of the converging annular extension 148. The choke 150 represents the minimum cross-sectional area of the annular extension 148, and is not intended to be understood as a choked flow of cooling fluid. A diverging section 152 is disposed between the choke 150 and the scavenge conduit 132, comprising an increasing cross-sectional area between the choke 150 and the scavenge conduit 132. As such, any flow of fluid accelerated through the gap 146 decelerates upon entering the diverging section 152.

It should be appreciated that the geometry of the flow accelerator 126, the nozzle 144, the annular extension 148, the choke 150, the gap 146, the second gap 154, and the diverging section 152 are exemplary as illustrated. The lengths of each aforementioned element can vary and the linear elements can be curved or angled, such that the elements can comprise a convex or concave dimension. Furthermore, the gap 146 can be determine relative to the diameter of the choke 150, such that the gap 146 to choke 150 ratio can be between 1:1 and 1:4 with the ratio preferably being between 1:1 and 1:2.

Figure 6:
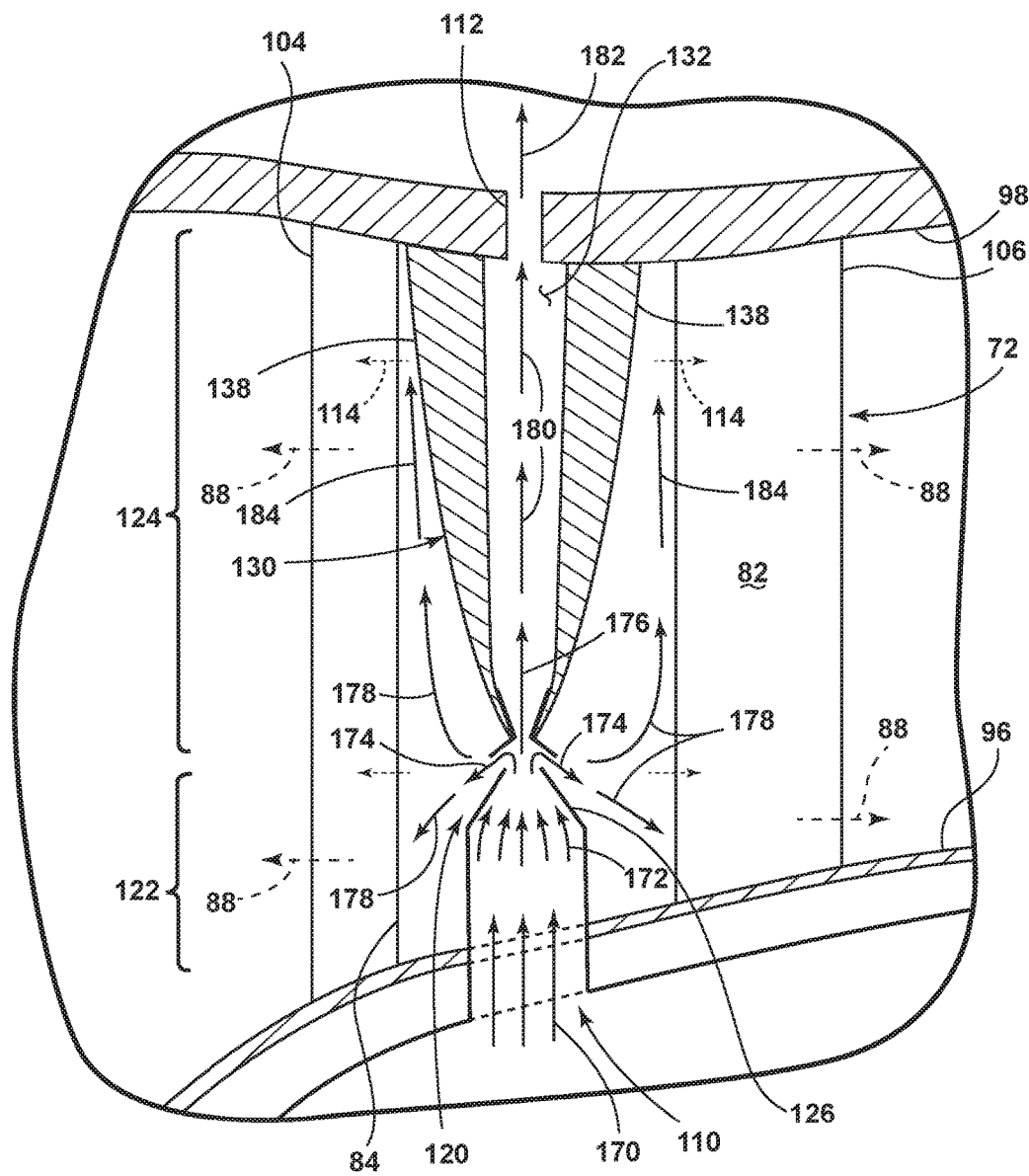
FIG. 6 is a cross-sectional diagram of a cooling fluid flow of the vane of FIG. 4.

In FIG. 6, the virtual impactor 120 removes particles from the flow of a cooling fluid within the vane 72. While the cooling fluid flow is illustrated as moving substantially in a radially outward direction, relative to the engine centerline, it should be understood that the virtual impactor 120 could be utilized in a cooling fluid flow moving in the opposite direction toward the engine centerline, or within an engine component orienting the cooling fluid flow in any direction. An inlet flow 170 of cooling fluid is provided through the inlet 110 and the first portion 122 of the virtual impactor 120. The inlet flow 170 is accelerated into an accelerated flow 172 as it enters the flow accelerator 126. The accelerated flow 172 exits the first portion 122 of the virtual impactor 120 and is separated into two separate flows comprising a major flow 174 and a minor flow 176.

The major flow 174, which can comprise about 90% of the initial inlet flow 170, moving through the virtual impactor 120 inlet will move into the internal body 84 as the major flow 174. The minor flow 176, which can comprise about the remaining 10% of the initial inlet flow 170, will travel into the scavenge conduit 132 within the second portion 124 of the virtual impactor 120, defining a scavenge flow. A pressure differential between the interior chamber 82 and the scavenge conduit 132 can maintain the separation of the major and minor flows 174, 176, such as a 90% to 10% ratio of major flow 174 to minor flow 176. Alternatively, the geometry of the virtual impactor 120 or the pressures maintained within the cooling circuit can be adapted to provide any ratio of major flow 174 to minor flow 176.

A volume of particles can be entrained within the initial flow 170 of the cooling fluid, traveling from the exterior environment. The particles can comprise matter such as dirt, sand, dust, volcanic ash, or other environmental contaminants that can travel through the engine system with the cooling fluid. The virtual impactor 120 accelerates the inlet flow 170 to an accelerated flow 172 at the acceleration inlet 128, accelerating the particles held within the cooling fluid flow. As the cooling fluid flow exits the flow accelerator 126, momentum carries the particles through the choke 150 and into the particle collector 130. The mass of the particles defines a momentum for the particles which carries the particles through the choke 150 and into the scavenge conduit 132. The larger portion of the cooling fluid can make the turn at the major flow 174 to travel through the first portion 122 and into the interior chamber 82, while the momentum of the particles cannot make the turn with the major flow 174 and are constrained to enter the particle collector 130. As such, the virtual impactor 120 operates to remove an amount of particles from the inlet flow 170, separating the major flow 174 into a cleaned flow 178 and the minor flow 176 into a dirty flow 180. As the dirty flow 180 moves through the scavenge conduit 132, the 10% cooling fluid is removed through the outlet 106 as a scavenge fluid stream 182 which can be provided for other uses within the engine or the vehicle. It should be appreciated that while the major flow 174 is a cleaned flow 178, it can still contain an amount of particles that are not carried into the particle collector 130.

The increasing cross-sectional area 138 of the second portion 124 defines a converging space 137 within the internal body 84 such that the clean flow 178 moving along the external surface of the increasing cross-sectional area 138 is accelerated into an accelerated flow 184 along the length of the internal body 84. As such, an effective flow of cooling fluid will be provided through the internal apertures 114 to the interior chamber 82, providing cooling fluid to the film holes 88 for exhausting a film of cooling fluid on the external surface of the vane 72. Alternatively, the vane 72 or the internal structure of the vane 72 can have a decreasing cross-section, which can be continuous, relative to the particle collector 130 to develop the accelerated flow 184. It should be understood that the converging space within the internal body 84 defined by the increasing cross-sectional area 138 of the second portion 124 is particular to the vane 72 structure and may not be necessary when the virtual impactor 120 is implemented in different engine components.

It should be appreciated that the particles collector as oriented is exemplary, and can be oriented in any direction, such as radial, axial, forward, aft, or any combination thereof, relative to the engine centerline, to define at least a portion of a cooling circuit within an engine component. The engine component, illustrated as a vane is also exemplary. Alternative engine components can comprise a hanger bracket or associated elements, or an engine blade comprising an airfoil shape similar to the vane.

It should be further appreciated that the particle separator operates to remove particles from a flow of cooling fluid. The system can be discriminative, removing a majority of particles based upon particle size, mass, or a combination thereof. As such, any particles remaining within the major flow can comprise a size or mass small to pass through remaining portions of the cooling circuit, such as the film holes, reducing associated clogging or damage to the components.

It should be further appreciated that the virtual impactor as described herein is ideal for removing particles from a flow of cooling fluid passing through the vane or engine component. However, different particles separators can be utilized within the system in order to achieve effective cooling circuit while separating particles from the flow of cooling fluid.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A nozzle assembly for a gas turbine engine having a compressor, a combustor, and a turbine contained within a casing, the nozzle assembly comprising:
    at least one pair of static vanes having roots and tips radially supported by an inner band and an outer band, respectively, and defining a turbine nozzle between the pair of static vanes, with at least one of the static vanes having an interior chamber; and
    a cooling circuit, comprising:
        a cooling circuit inlet fluidly coupled to the interior chamber;
        a scavenge flow outlet fluidly coupled to the interior chamber;
        a cleaned flow outlet fluidly coupled to the interior chamber; and
        a virtual impactor located within the interior chamber and comprising:
            a first portion fluidly coupled to the cooling circuit inlet and a second portion fluidly coupled to the scavenge flow outlet and spaced from the first portion to define a physical gap between the first and second portions, with the gap having a first gap portion fluidly coupled to the cleaned flow outlet;
            a flow accelerator located in the first portion and having an accelerator inlet and an accelerator outlet, which is smaller in cross-sectional area than the accelerator inlet, with the accelerator outlet opening into the gap; and
            a particle collector located in the second portion and having a collector inlet opening into a second gap portion of the gap and a collector outlet fluidly coupled to the scavenge flow outlet.

2. The nozzle assembly of claim 1 wherein the flow accelerator comprises a nozzle having a decreasing cross section in a flow direction.

3. The nozzle assembly of claim 2 wherein the nozzle of the flow accelerator has a cone-shape.

4. The nozzle assembly of claim 1 wherein the particle collector comprises a flow decelerator defining the collector inlet.

5. The nozzle assembly of claim 4 wherein the flow decelerator comprises a nozzle having an increasing cross section in a flow direction.

6. The nozzle assembly of claim 1 wherein the particle collector comprises at least a portion having an increased cross-sectional area to effect a reduction in a cross-sectional area between the particle collector and the at least one static vane.

7. The nozzle assembly of claim 6 wherein the at least a portion of the particle collector comprises a continuously increasing cross-sectional area.

8. The nozzle assembly of claim 1 wherein the particle collector and the at least one of the static vanes are shaped to effect a reduction in a cross-sectional area between the particle collector and the at least one of the static vanes to define an acceleration zone.

9. The nozzle assembly of claim 8 wherein the reduction in cross-sectional area is continuous.

10. The nozzle assembly of claim 9 wherein the reduction in cross-sectional area extends along a length of the particle collector.

11. The nozzle assembly of claim 1 wherein the collector inlet further includes a choke defining a minimum cross-sectional area of the particle collector.

12. The nozzle assembly of claim 11 wherein a ratio of a length of the gap to a diameter of the choke is between 1:1 and 1:4.

13. The nozzle assembly of claim 12 wherein the ratio of the length of the gap to the diameter of the choke is between 1:1 and 1:2.

14. The nozzle assembly of claim 1 wherein the flow accelerator defines a first longitudinal axis extending longitudinally through the flow accelerator and the particle collector defines a second longitudinal axis extending longitudinally through the particle collector.

15. The nozzle assembly of claim 14 wherein the first and second longitudinal axes are parallel but laterally misaligned from one another such that the flow accelerator and the particle collector are offset.

16. The nozzle assembly of claim 14 wherein the first and second longitudinal axes are angularly misaligned relative to an axis extending radially from an engine centerline.

17. A component for a gas turbine engine having a compressor, a combustor, and a turbine within a casing, the component comprising:
at least one static vane having a root and a tip radially supported by an inner band and an outer band, respectively, and having an interior chamber; and
a cooling circuit, comprising:
a cooling circuit inlet fluidly coupled to the interior chamber;
a scavenge flow outlet fluidly coupled to the interior chamber; and
a virtual impactor located within the interior chamber, comprising:
a first portion fluidly coupled to the cooling circuit inlet and having a flow accelerator with an accelerator inlet and an accelerator outlet, with the first portion receiving a dirty inlet flow;
a second portion fluidly coupled to the scavenge flow outlet;
a collector inlet;
a collector outlet fluidly coupled to the cooling circuit inlet, the collector outlet being aligned with and spaced from the collector inlet to define a physical gap between the first and second portions, with the gap separating the dirty inlet flow into a cleaned flow and a scavenge flow aligned with the dirty inlet flow;
a cleaned flow outlet at least partially defined by the gap and supplying the cleaned flow to the interior chamber exteriorly of the virtual impactor; and
a scavenge conduit defined between the collector inlet and collector outlet and receiving the scavenge flow from the collector outlet.

18. The component of claim 17 further comprising an outer wall in the second portion at least partially defining a converging space in the interior chamber between the virtual impactor and the component.

19. The component of claim 18 wherein a reduced particle cooling fluid stream is emitted through a first portion of the gap and the cleaned flow outlet.

20. The component of claim 19 wherein the converging space is downstream of the gap.

21. The component of claim 20 wherein the converging space extends along a length of the virtual impactor.

22. The component of claim 21 wherein the converging space continuously converges.

23. The component of claim 22 wherein the converging space begins at the gap.

24. The component of claim 18 wherein the converging space continuously converges.

* * * * *